(12) United States Patent
Nakamura et al.

(10) Patent No.: US 10,060,514 B2
(45) Date of Patent: Aug. 28, 2018

(54) CONTINUOUSLY VARIABLE CHAIN-BELT TRANSMISSION AND METHOD OF ASSEMBLING SAME

(75) Inventors: Takayuki Nakamura, Sagamihara (JP); Hidekazu Yagi, Atsugi (JP); Kazutaka Imai, Machida (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 1861 days.

(21) Appl. No.: 13/023,911

(22) Filed: Feb. 9, 2011

(65) Prior Publication Data

US 2011/0244999 A1 Oct. 6, 2011

(30) Foreign Application Priority Data

Mar. 31, 2010 (JP) ................................. 2010-080051

(51) Int. Cl.
| | |
|---|---|
| *F16H 57/04* | (2010.01) |
| *F16H 9/18* | (2006.01) |
| *F16H 57/023* | (2012.01) |
| *F16H 7/18* | (2006.01) |

(52) U.S. Cl.
CPC ............. *F16H 9/18* (2013.01); *F16H 57/023* (2013.01); *F16H 57/0456* (2013.01); *F16H 7/18* (2013.01); *F16H 57/0489* (2013.01); *Y10T 29/49826* (2015.01)

(58) Field of Classification Search
CPC ...... F16H 9/18; F16H 57/023; F16H 57/0456; F16H 7/18; F16H 57/0489; Y10T 29/49826

USPC .................................................. 474/140, 91
See application file for complete search history.

(56) References Cited

U.S. PATENT DOCUMENTS

| | | | | |
|---|---|---|---|---|
| 5,033,989 | A | * | 7/1991 | Shimaguchi ...................... 474/8 |
| 5,665,019 | A | * | 9/1997 | Sheffer et al. ................ 474/111 |
| 5,846,150 | A | * | 12/1998 | Wigsten ........................ 474/140 |
| 6,120,403 | A | * | 9/2000 | Suzuki et al. ................ 474/111 |
| 6,322,470 | B1 | * | 11/2001 | Markley et al. .............. 474/111 |
| 6,435,994 | B1 | * | 8/2002 | Friedmann et al. .......... 474/145 |
| 6,524,202 | B1 | * | 2/2003 | Tada et al. .................... 474/109 |

(Continued)

FOREIGN PATENT DOCUMENTS

| | | |
|---|---|---|
| DE | 10 2009 019 069 A1 | 11/2009 |
| FR | 2 779 200 A1 | 12/1999 |

(Continued)

*Primary Examiner* — Michael A Riegelman
(74) *Attorney, Agent, or Firm* — Foley & Lardner LLP

(57) ABSTRACT

A continuously variable chain-belt transmission (chain-belt CVT) housed in a transmission casing formed by a transmission case and a side cover, has a pair of conical disk pairs, each pair of which is rotatably supported by disk supporting portions provided in the transmission case and the side cover; a chain wound around the pair of conical disk pairs; a chain guide attached to the chain to restrain movement of the chain and having an annular guide portion that encloses an entire circumference, in cross section, of the chain; and a chain guide supporting portion supporting the chain guide between the transmission case and the side cover. The chain guide supporting portion has a fixing side chain guide supporting portion fixed to the transmission case and a connecting side chain guide supporting portion connecting to the fixing side chain guide supporting portion.

6 Claims, 12 Drawing Sheets

(56) References Cited

U.S. PATENT DOCUMENTS

| | | | |
|---|---|---|---|
| 6,537,166 B1 * | 3/2003 | Adriaenssens et al. | 474/8 |
| 6,626,781 B2 * | 9/2003 | Van Der Kamp et al. | 474/91 |
| 6,955,621 B2 * | 10/2005 | Wigsten et al. | 474/110 |
| 7,252,608 B2 * | 8/2007 | Reisch et al. | 474/8 |
| 7,354,364 B2 | 4/2008 | Glas et al. | |
| 7,390,276 B2 * | 6/2008 | Tryphonos | 474/109 |
| 7,513,843 B2 * | 4/2009 | Markley et al. | 474/111 |
| 7,603,893 B2 | 10/2009 | Bitzer et al. | |
| 2002/0160868 A1 * | 10/2002 | Wigsten et al. | 474/101 |
| 2004/0142792 A1 | 7/2004 | Glas et al. | |
| 2005/0277500 A1 | 12/2005 | Bitzer et al. | |
| 2006/0247080 A1 * | 11/2006 | Wigsten et al. | 474/111 |
| 2007/0190830 A1 * | 8/2007 | Wodtke et al. | 439/153 |

FOREIGN PATENT DOCUMENTS

| | | |
|---|---|---|
| JP | 2004-191379 A | 7/2004 |
| JP | 2005-282695 A | 10/2005 |
| WO | WO 03/087846 A2 | 10/2003 |

\* cited by examiner

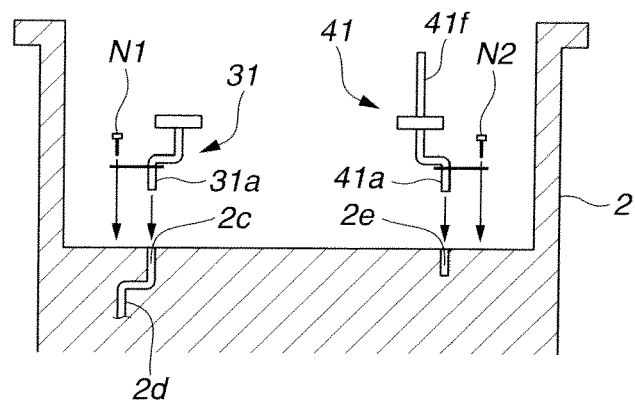
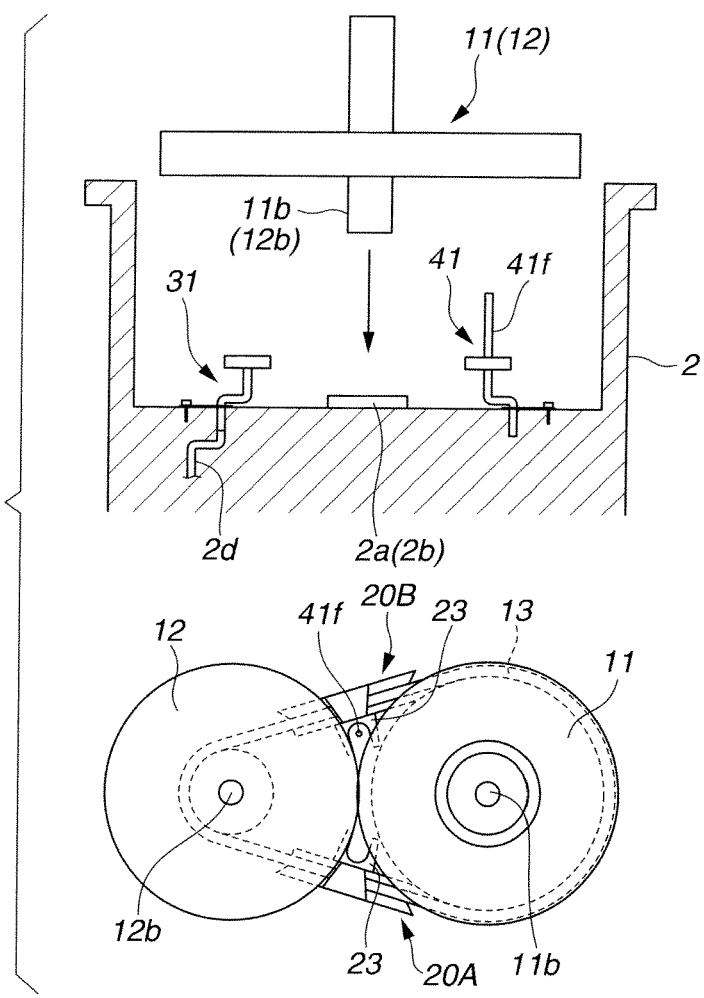

CONTINUOUSLY VARIABLE CHAIN-BELT TRANSMISSION AND METHOD OF ASSEMBLING SAME

BACKGROUND OF THE INVENTION

The present invention relates to a continuously variable chain-belt transmission and a method of assembling the continuously variable chain-belt transmission, which continuously changes a transmission ratio by changing radii of winding parts of chain wound around a pair of conical pulley pairs.

In recent years, there have been proposed and developed various continuously variable chain-belt transmissions which continuously change a transmission ratio. In the continuously variable chain-belt transmission, an endless chain is wound around a pair of conical pulley pairs and pressed between each V-shaped groove formed by the conical pulley pair. The transmission ratio is continuously changed by controlling groove widths of the both conical pulley pairs and changing radii of winding parts of the endless chain. Such a continuously variable chain-belt transmission is disclosed in Japanese Patent Provisional Publication No. 2004-191379 (hereinafter is referred to as "JP2004-191379").

SUMMARY OF THE INVENTION

In the related art continuously variable chain-belt transmission in JP2004-191379, in order to prevent an occurrence of noise caused by slack strand and undulation of the chain, a chain guide that guides the chain is provided inside a transmission case.

However, the chain guide has an annular guide portion with which an entire circumference, in cross section, of the chain is enclosed and through which the chain passes. Because of this, first the chain guide is fitted or attached to the chain that is previously wound around the pair of conical pulley pairs, then the pair of conical pulley pairs and the chain guide are secured to the transmission case. Therefore, it is required that both positioning of axes of the chain guide and the pair of conical pulley pairs should be done together at the same time.

That is, in order to fit the chain guide having the annular guide portion to the endless chain, the chain guide is previously separated into two, and after sandwiching the chain by the both separated chain guides, the both separated chain guides are fixed together. For this reason, after the two conical pulley pairs are secured to the transmission case, it is impossible to sandwich the chain by the separated chain guides.

Further, a chain guide supporting portion is provided to support the chain guide. The chain guide supporting portion is supported between the transmission case and a side cover, and is secured to the transmission case before the fitting of the chain guide.

Because of these structures, it is required that both positioning of axes of the chain guide and the two conical pulley pairs should be done together at the same time. This causes difficulty in assembling the continuously variable chain-belt transmission and lead to delay in the assembly.

It is therefore an object of the present invention to provide a continuously variable chain-belt transmission and a method of assembling the continuously variable chain-belt transmission, which is capable of facilitating the assembly and improving the workability of the assembly when securing the two conical pulley pairs and the chain guide to the transmission case after the chain guide is previously fitted to the chain.

According to one aspect of the present invention, a continuously variable chain-belt transmission (chain-belt CVT) housed in a transmission casing formed by a transmission case and a side cover, comprises: a pair of conical disk pairs, each pair of which is rotatably supported by disk supporting portions provided in the transmission case and the side cover; a chain wound around the pair of conical disk pairs; a chain guide attached to the chain to restrain movement of the chain and having an annular guide portion that encloses an entire circumference, in cross section, of the chain; and a chain guide supporting portion supporting the chain guide between the transmission case and the side cover and having (a) a fixing side chain guide supporting portion fixed to the transmission case; and (b) a connecting side chain guide supporting portion connecting to the fixing side chain guide supporting portion.

According to another aspect of the invention, a method for assembling a continuously variable chain-belt transmission (chain-belt CVT), the chain-belt CVT housed in a transmission casing formed by a transmission case and a side cover and having a pair of conical disk pairs, a chain wound around the pair of conical disk pairs, a chain guide having an annular guide portion that encloses an entire circumference, in cross section, of the chain and supporting the chain, and a chain guide supporting portion supporting the chain guide and having a fixing side chain guide supporting portion and a connecting side chain guide supporting portion, the method comprises: a sub-line assembling process having (a) a procedure for assembling the chain guide in which the chain guide is attached to the chain with the entire circumference, in cross section, of the chain enclosed by the annular guide portion; and (b) a procedure for winding the chain in which the chain is wound around the conical disk pairs; a case assembling process in which the fixing side chain guide supporting portion is fixed to the transmission case; a transmission assembling process in which, after fixing positions of rotation shafts of the conical disk pairs around which the chain is wound in the sub-line assembling process with respect to the transmission case, the conical disk pairs are fixed to disk supporting portions provided in the transmission case; a guide supporting portion assembling process in which, after fixing a position of the chain guide attached to the chain in the sub-line assembling process with respect to the fixing side chain guide supporting portion, the connecting side chain guide supporting portion is connected to the fixing side chain guide supporting portion; and a cover fixing process in which, by fixing the side cover to the transmission case, the connecting side chain guide supporting portion is supported by the fixing side chain guide supporting portion and the side cover.

The other objects and features of this invention will become understood from the following description with reference to the accompanying drawings.

BRIEF DESCRIPTION OF THE DRAWINGS

FIG. 6A is a perspective view, FIG. 6B is a side view, and FIG. 6C is a sectional view taken along a B-B line in FIG. 6B.

FIG. 7A is a sectional view, FIG. 7B is a sectional view taken along a C-C line in FIG. 7A, and FIG. 7C is a perspective exploded view.

FIG. 8A is a sectional view, FIG. 8B is a perspective exploded view.

FIG. 9A shows a procedure for assembling the chain guide. FIG. 9B shows a procedure for winding the chain.

FIGS. 9C and 9D are drawings for explaining a method of assembling the continuously variable chain-belt transmission of the embodiment 1. FIG. 9C is a case assembling process. FIG. 9D is a transmission assembling process.

FIG. 9E is a guide supporting portion assembling process. FIG. 9F is a cover fixing process.

DETAILED DESCRIPTION OF THE INVENTION

According to an automatic transmission of the present invention, a chain guide supporting portion has a fixing side chain guide supporting portion fixed to a transmission case and a connecting side chain guide supporting portion connecting to the fixing side chain guide supporting portion.

With this structure, the chain guide supporting portion can be split in half or separated into two portions. Then a pair of conical disk pairs, a chain, a chain guide, which are sub-assembled, are fixed to the transmission case first, and the connecting side chain guide supporting portion is connected to the fixing side chain guide supporting portion, thereby fixing or installing the chain guide to the transmission case.

As a consequence, simultaneous positioning of axes of the conical disk pairs and the chain guide is not required. This facilitates the assembly and improves the workability of the assembly when securing the two conical pulley pairs and the chain guide to the transmission case after the chain guide is previously fitted to the chain.

Embodiments of the present invention will now be explained below with reference to the drawings.

[Embodiment 1]

Figure 1:
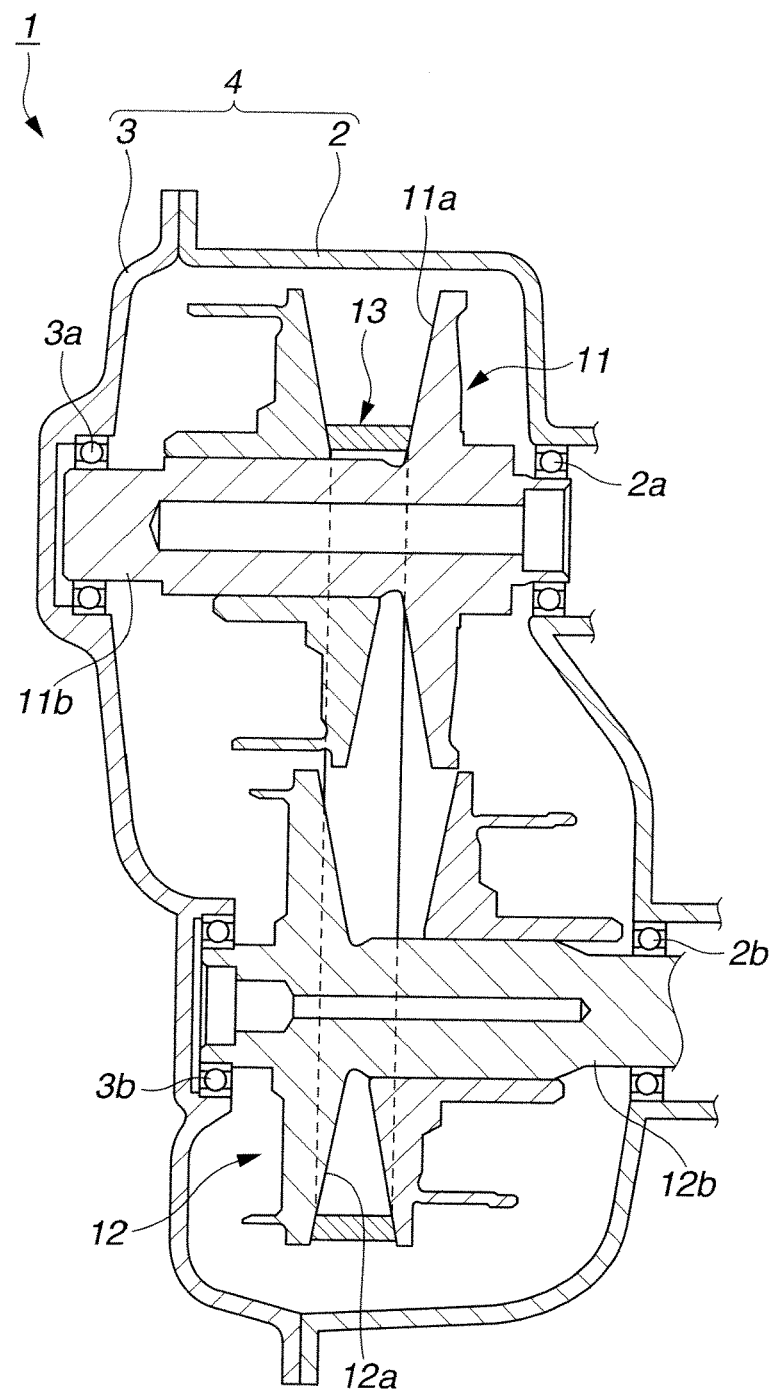
FIG. 1 is a schematic view showing a main part of a continuously variable chain-belt transmission according to an embodiment 1.
Figure 2:
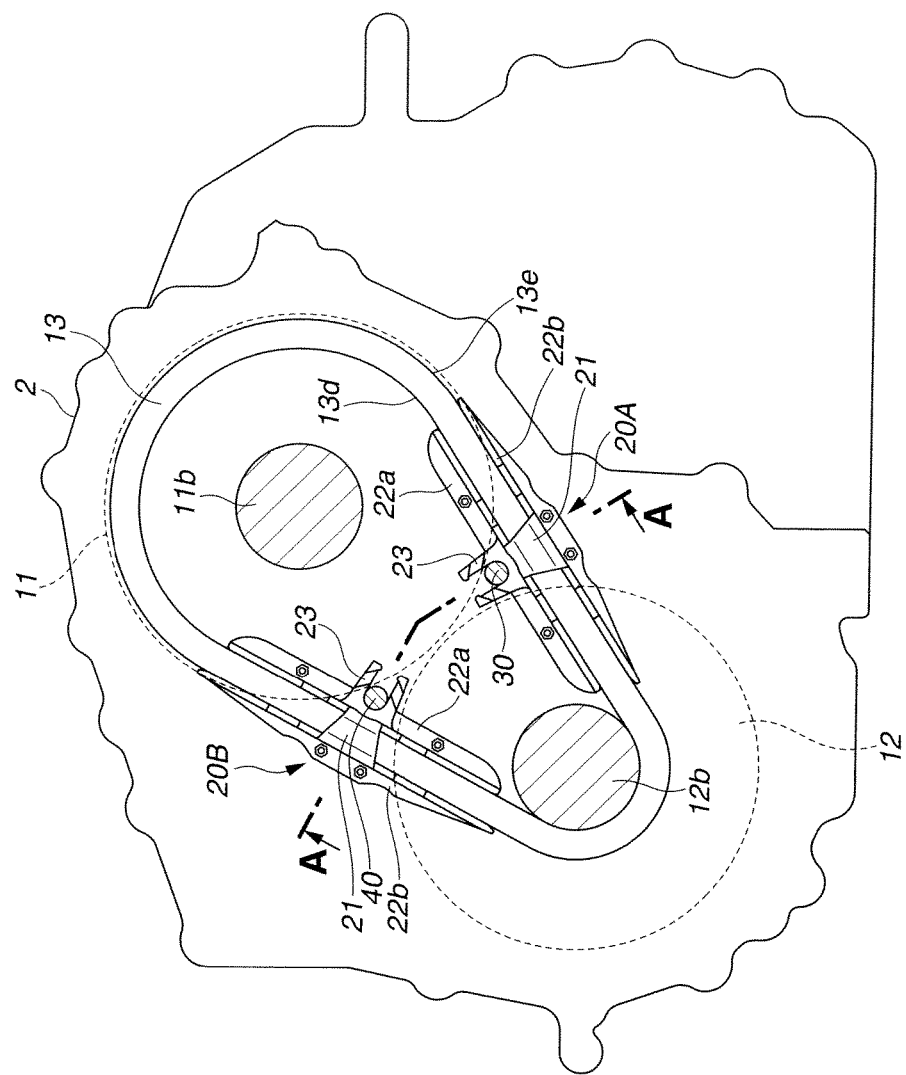
FIG. 2 is a schematic side view of the continuously variable chain-belt transmission with a side cover removed.
Figure 3:
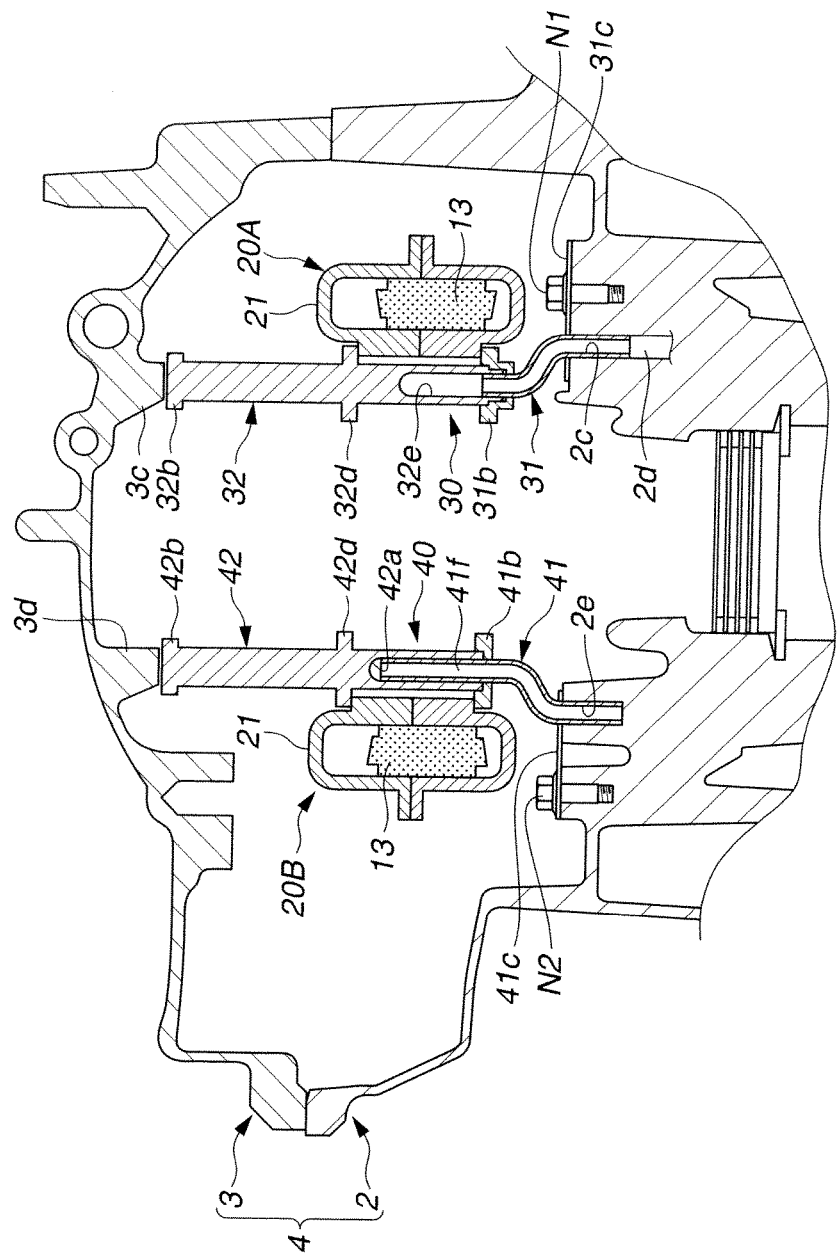
FIG. 3 is a sectional view taken along an A-A line in FIG. 2.
Figure 4:
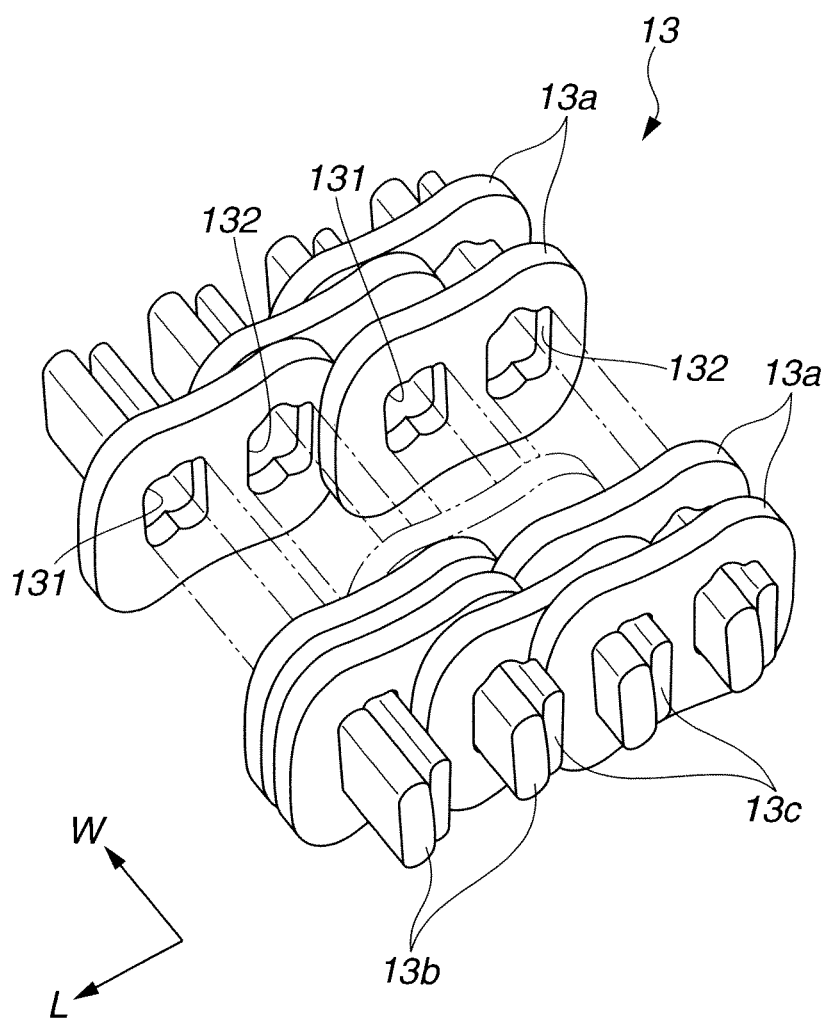
FIG. 4 is an enlarged perspective view of a part of chain.
Figure 5:
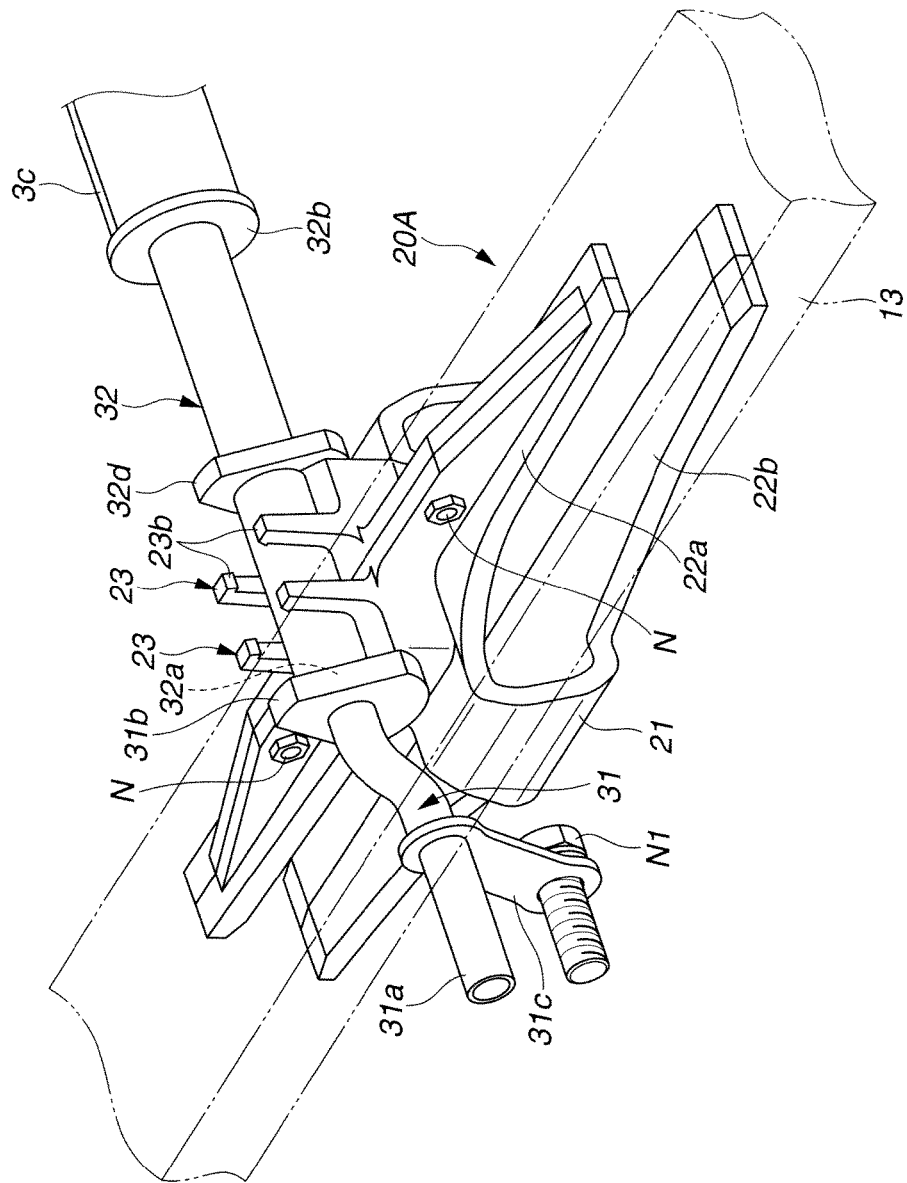
FIG. 5 is a perspective view showing a supporting structure of a chain guide.

First, configuration of the present invention will be explained. FIG. 1 is a schematic view showing a main part of a continuously variable chain-belt transmission according to an embodiment 1. FIG. 2 is a schematic side view of the continuously variable chain-belt transmission with a side cover removed. FIG. 3 is a sectional view taken along an A-A line in FIG. 2. FIG. 4 is an enlarged perspective view of a part of chain. FIG. 5 is a perspective view showing a supporting structure of a chain guide.

A continuously variable chain-belt transmission (hereinafter called chain-belt CVT) 1 of the embodiment 1 has a function of continuously changing a transmission ratio that is a ratio between an input rotation speed to a primary pulley 11 and an output rotation speed from a secondary pulley 12 by changing radii of winding parts of chain. The chain-belt CVT 1 has a pair of conical pulley pairs (a pair of conical disk pairs) of the primary pulley 11 and the secondary pulley 12, an endless chain 13 that is wound around these primary and secondary pulleys 11, 12 and a transmission casing 4 that is formed by a transmission case 2 and a side cover 3.

The primary pulley 11 has primary sheave surfaces 11a having a V-shaped cross section (forming a V-shaped groove) and a rotation shaft 11b provided between the transmission case 2 and the side cover 3. The chain 13 is sandwiched and pressed between the primary sheave surfaces 11a. Width of the primary sheave surfaces 11a is controlled by hydraulic pressure. The rotation shaft 11b is rotatably supported by a case side primary shaft supporting portion (a disk supporting portion) 2a provided in the transmission case 2 and a cover side primary shaft supporting portion (a disk supporting portion) 3a provided in the side cover 3.

The secondary pulley 12 has secondary sheave surfaces 12a having a V-shaped cross section (forming a V-shaped groove) and a rotation shaft 12b provided between the transmission case 2 and the side cover 3. The chain 13 is also sandwiched and pressed between the secondary sheave surfaces 12a. Width of the secondary sheave surfaces 12a is controlled by hydraulic pressure. The rotation shaft 12b is rotatably supported by a case side secondary shaft supporting portion (a disk supporting portion) 2b provided in the transmission case 2 and a cover side secondary shaft supporting portion (a disk supporting portion) 3b provided in the side cover 3.

As shown in FIG. 4, the chain 13 is formed by a plurality of links 13a. The link 13a has, at longitudinal direction both ends thereof, penetration holes 131, 132. The plurality of links 13a are arranged in a chain length direction (a turning direction) L and a chain width direction W and are connected to each other with a first pin 13b and a second pin 13c. The bendable endless chain 13 is then obtained. A pair of chain guides 20A, 20B are fitted or attached to this chain 13, and deflections, vibration, undulation, etc. of the chain 13 between both pulleys 11, 12 are restrained.

The pair of chain guides 20A, 20B are provided on opposite sides of a line connecting the rotation shafts 11b, 12b of the both pulleys 11, 12 without interfering with the primary and secondary sheave surfaces 11a, 12a of the both pulleys 11, 12 (see FIG. 2). The chain guide 20A is rotatably supported by a lubrication side chain guide supporting portion (a first chain guide supporting portion) 30 provided between the transmission case 2 and the side cover 3. The chain guide 20B is rotatably supported by a non-lubrication side chain guide supporting portion (a second chain guide supporting portion) 40 provided between the transmission case 2 and the side cover 3.

Figure 6A:
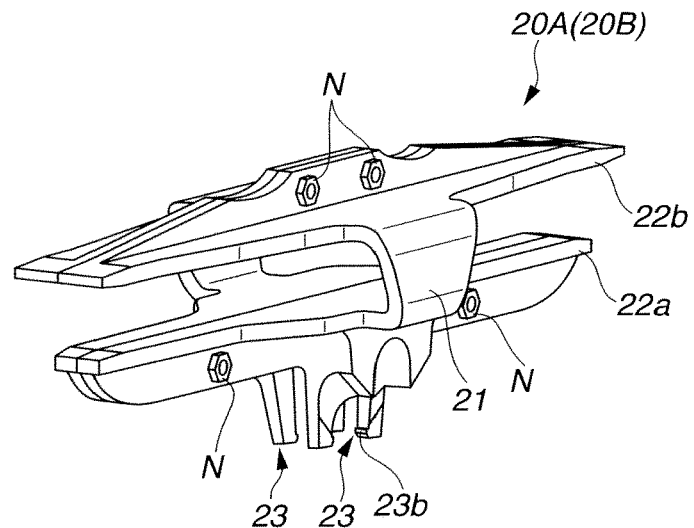
FIGS. 6A~6C show the chain guide.
Figure 6B:
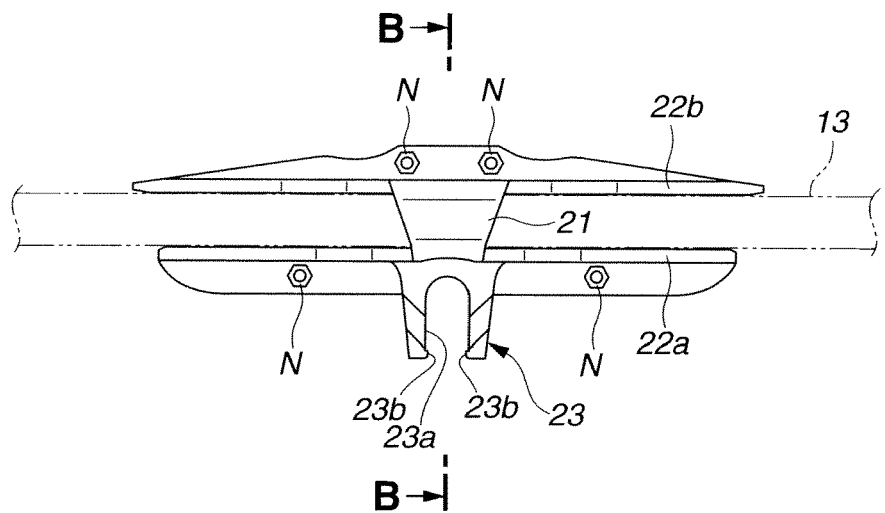
Figure 6C:
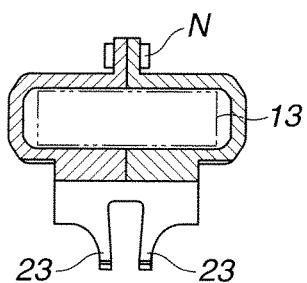

FIGS. 6A~6C show the chain guide. FIG. 6A is a perspective view, FIG. 6B is a side view, and FIG. 6C is a sectional view taken along a B-B line in FIG. 6B.

The chain guide 20A has an annular guide portion 21 whose both ends open, a pair of guide portions of first and second guide portions 22a, 22b which protrude from the both open ends of the annular guide portion 21 and extend in both length directions of the chain 13 and a stem supporting portion 23 which supports the lubrication side chain guide supporting portion 30. The chain guide 20A can split in half at a center of the width direction W of the chain 13 and unite with each other by fixing these split parts together with a plurality of screws N.

As for the chain guide 20B, its structure is the same as that of the chain guide 20A. Thus, an explanation of the chain guide 20B is omitted here.

The annular guide portion 21 has a frame structure in which an entire circumference, in cross section, of the chain 13 is enclosed.

The first and second guide portions 22a, 22b face each other so as to sandwich the chain 13. As can be seen in FIG. 2, the first guide portion 22a faces a rotation inner side surface 13d of the chain 13. The second guide portion 22b faces a rotation outer side surface 13e of the chain 13.

The stem supporting portion 23 protrudes from a circumferential surface of the annular guide portion 21. The stem supporting portion 23 has a holding hook 23a having a U-shaped cross section and an opening end and a pair of projections 23b, 23b that slightly project inwards from the opening end of the holding hook 23a. The holding hook 23a has an inside diameter in which the lubrication side chain guide supporting portion 30 is rotatably fitted. A distance between the pair of projections 23b, 23b is set to such width that the lubrication side chain guide supporting portion 30 cannot drop off or come off the holding hook 23a. Here, a pair of stem supporting portions 23, 23 are provided.

Figure 7A:
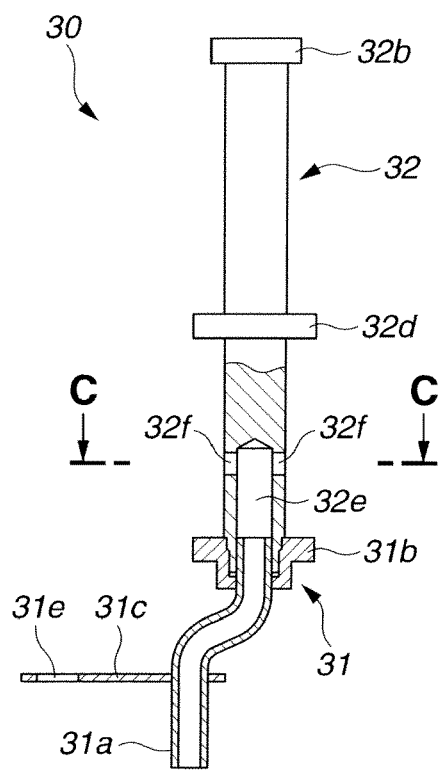
FIGS. 7A~7C show a lubrication side chain guide supporting portion.
Figure 7B:
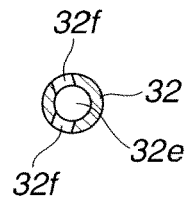
Figure 7C:
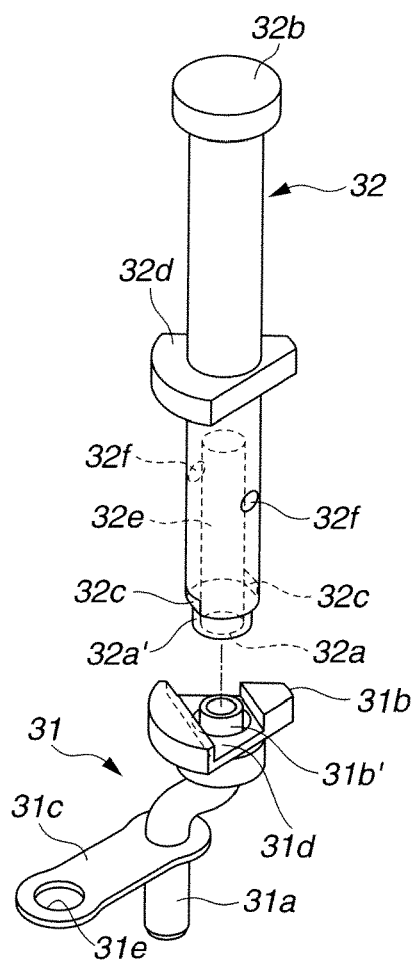

FIGS. 7A~7C show the lubrication side chain guide supporting portion. FIG. 7A is a sectional view, FIG. 7B is a sectional view taken along a C-C line in FIG. 7A, and FIG. 7C is a perspective exploded view.

The lubrication side chain guide supporting portion (the first chain guide supporting portion) 30 is positioned between the rotation shaft 11b supporting the primary pulley 11 and the rotation shaft 12b supporting the secondary pulley 12. The lubrication side chain guide supporting portion 30 has a lubricating oil tube (a fixing side chain guide supporting portion) 31 fixed to the transmission case 2 and a cylindrical lubrication side cap guide (a connecting side chain guide supporting portion) 32 connecting to this lubricating oil tube 31 upon assembling.

The lubricating oil tube 31 is formed by a pipe member whose both ends open. One end 31a of the lubricating oil tube 31 is inserted and fitted into an oil hole 2c of the transmission case 2, and connects to a case side lubrication circuit 2d that is formed in the transmission case 2 (see FIG. 3). Further, as shown in FIGS. 3 and 7C, a flange 31b is provided at a top end 31b' of the lubricating oil tube 31, and a fixing plate member 31c to fix the lubricating oil tube 31 to the transmission case 2 is secured to a middle portion of the lubricating oil tube 31. The flange 31b is provided with a depressed portion 31d having linear inner side surfaces. The fixing plate member 31c has a penetration hole 31e where a fixing screw N1 penetrates.

The lubricating oil tube 31 bends at an upper position of the fixing plate member 31c and has an L-shape like a crank. As seen in FIG. 3, an axial position of the top end 31b' with respect to one end 31a of the lubricating oil tube 31 is offset to a rotation inner side of the chain 13.

The lubrication side cap guide 32 has, at one end 32a' thereof, an opening portion 32a into which the lubricating oil tube 31 is inserted. Further, a flat contact portion 32b that is contiguous with or touches a first contact protrusion 3c formed in the side cover 3 is provided at the other end of the lubrication side cap guide 32. One end 32a' is provided with, at an outer side surface thereof, cutting surfaces 32c that are contiguous with or touch the inner side surfaces of the depressed portion 31d formed in the flange 31b of the lubricating oil tube 31.

Further, a middle flange 32d is provided in a middle of the lubrication side cap guide 32. Here, a portion from one end 32a' to the middle flange 32d corresponds to a guide supporting portion which is fitted in the holding hook 23a of the chain guide 20A and supports the chain guide 20A. A portion from the middle flange 32d to the contact portion 32b corresponds to a spacer portion which is positioned between the guide supporting portion and the side cover 3.

Furthermore, the lubrication side cap guide 32 has a lubricating oil passage 32e which extends from the opening portion 32a and communicates with the lubricating oil tube 31 inside the lubrication side cap guide 32, and has a pair of lubricating oil jets 32f, 32f which extend from the lubricating oil passage 32e and penetrate the lubrication side cap guide 32. The lubricating oil passage 32e extends in an axial direction of the lubrication side cap guide 32. The pair of lubricating oil jets 32f, 32f extend in a radial direction of the lubrication side cap guide 32. The pair of lubricating oil jets 32f, 32f open in directions facing to the rotation shaft 11b and the rotation shaft 12b when fixing the lubrication side cap guide 32 to the transmission casing 4.

The lubricating oil tube 31 and the lubricating oil passage 32e connect to the case side lubrication circuit 2d formed in the transmission case 2, and correspond to a supporting portion side lubrication circuit that squirts (ejects) or supplies the lubricating oil to the chain 13 and the primary and secondary pulleys 11, 12.

Figure 8A:
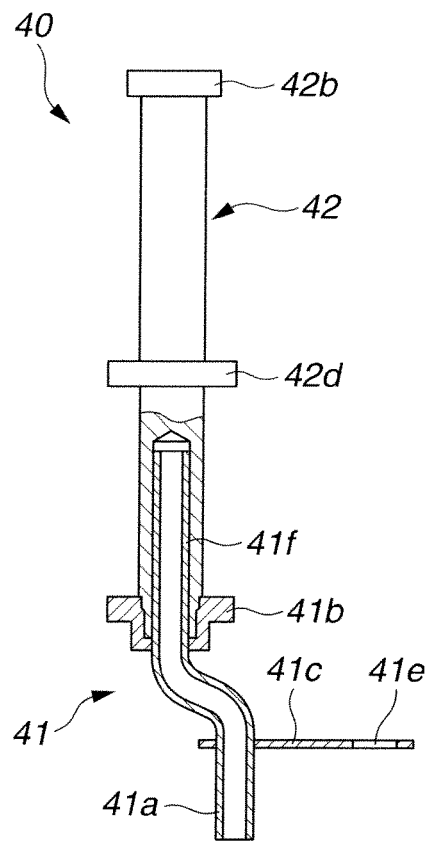
FIGS. 8A and 8B show a non-lubrication side chain guide supporting portion.
Figure 8B:
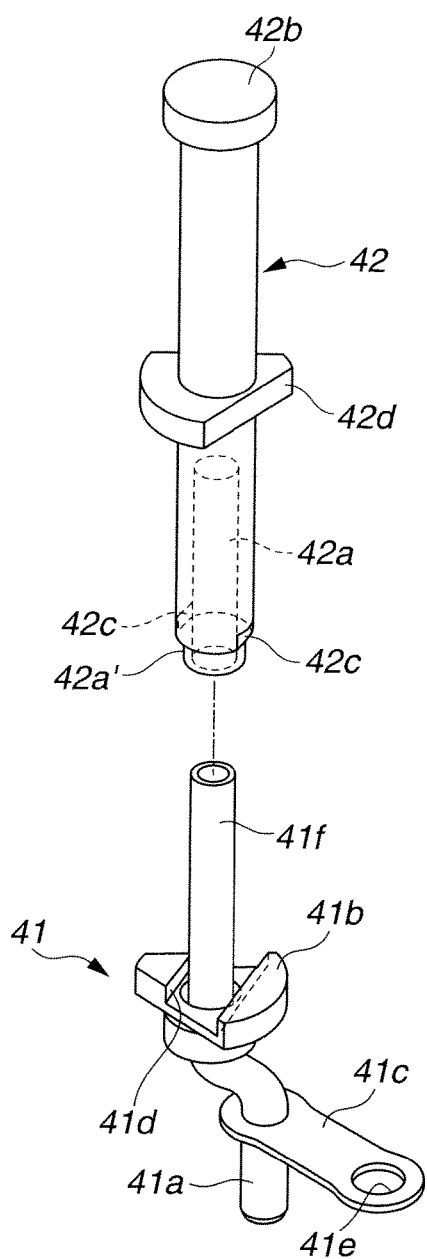

FIGS. 8A and 8B show the non-lubrication side chain guide supporting portion. FIG. 8A is a sectional view, FIG. 8B is a perspective exploded view.

The non-lubrication side chain guide supporting portion (the second chain guide supporting portion) 40 is positioned between the rotation shaft 11b supporting the primary pulley 11 and the rotation shaft 12b supporting the secondary pulley 12, and also faces the lubrication side chain guide supporting portion 30. The non-lubrication side chain guide supporting portion 40 has a temporarily fixing or pre-fixing pipe (a fixing side chain guide supporting portion) 41 fixed to the transmission case 2 and a cylindrical non-lubrication side cap guide (a connecting side chain guide supporting portion) 42 connecting to this pre-fixing pipe 41 upon assembling.

The pre-fixing pipe 41 is formed by a pipe member. One end 41a of the pre-fixing pipe 41 is inserted and fitted into a fixing hole 2e of the transmission case 2, then protrudes from the transmission case 2 (see FIG. 3). Further, as shown in FIGS. 3 and 8B, a flange 41b is provided in a middle portion of the pre-fixing pipe 41, and a fixing plate member 41c to fix the pre-fixing pipe 41 to the transmission case 2 is secured to the pre-fixing pipe 41. The flange 41b is provided with a depressed portion 41d having linear inner side surfaces. The fixing plate member 41c has a penetration hole 41e where a fixing screw N2 penetrates.

In addition, a top end portion 41f protruding from the flange 41b in an axial direction is inserted in the holding hook 23a of the chain guide 20B, and corresponds to a protruding portion that temporarily fixes a position of this chain guide 20B. Here, an outside diameter of the top end portion 41f is considerably smaller (thinner) than the inside diameter of the holding hook 23a.

The pre-fixing pipe 41 bends at an upper position of the fixing plate member 41c and has an L-shape like a crank. As seen in FIG. 3, an axial position of the top end portion 41f with respect to one end 41a of the pre-fixing pipe 41 is offset to a rotation inner side of the chain 13.

The non-lubrication side cap guide 42 has, at one end 42a' thereof, a fitting portion 42a into which the top end portion 41f of the pre-fixing pipe 41 is inserted and fitted. Further, a flat contact portion 42b that is contiguous with or touches a second contact protrusion 3d formed in the side cover 3 is provided at the other end of the non-lubrication side cap guide 42. One end 42a' is provided with, at an outer side surface thereof, cutting surfaces 42c that are contiguous with or touch the inner side surfaces of the depressed portion 41d formed in the flange 41b of the pre-fixing pipe 41.

Further, a middle flange 42d is provided in a middle of the non-lubrication side cap guide 42. Here, a portion from one end 42a' to the middle flange 42d corresponds to a guide supporting portion which is fitted in the holding hook 23a of the chain guide 20B and supports the chain guide 20B. A portion from the middle flange 42d to the contact portion 42b corresponds to a spacer portion which is positioned between the guide supporting portion and the side cover 3.

Next, a method of assembling the chain-belt CVT will be explained.

Figure 9A:
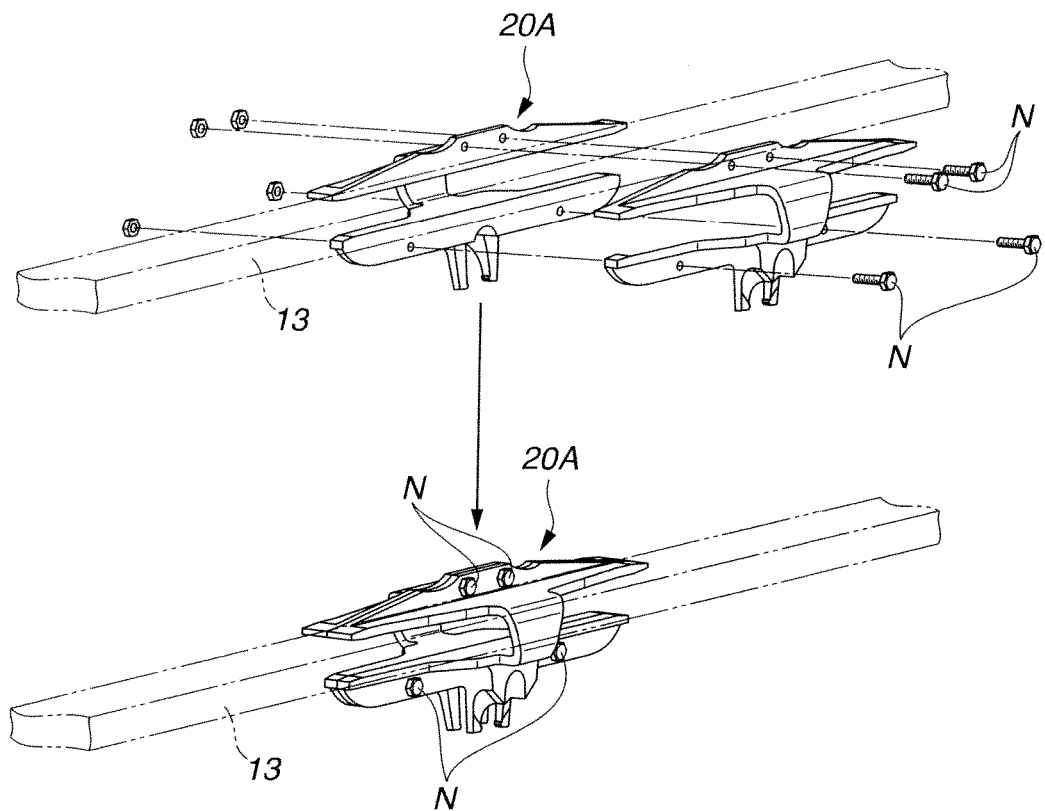
FIGS. 9A and 9B are drawings for explaining a method of assembling the continuously variable chain-belt transmission of the embodiment 1.
Figure 9B:
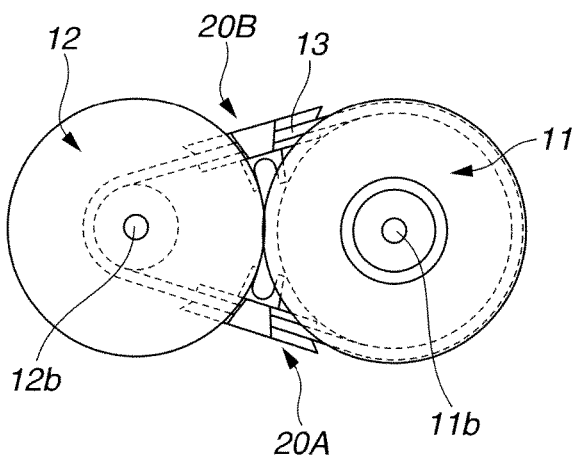

FIGS. 9A and 9B are drawings for explaining the method of assembling the chain-belt CVT of the c. FIG. 9A shows a procedure for assembling the chain guide. FIG. 9B shows a procedure for winding the chain.

FIGS. 9C and 9D are drawings for explaining a method of assembling the chain-belt CVT of the embodiment 1. FIG. 9C is a case assembling process. FIG. 9D is a transmission assembling process.

Figure 9E:
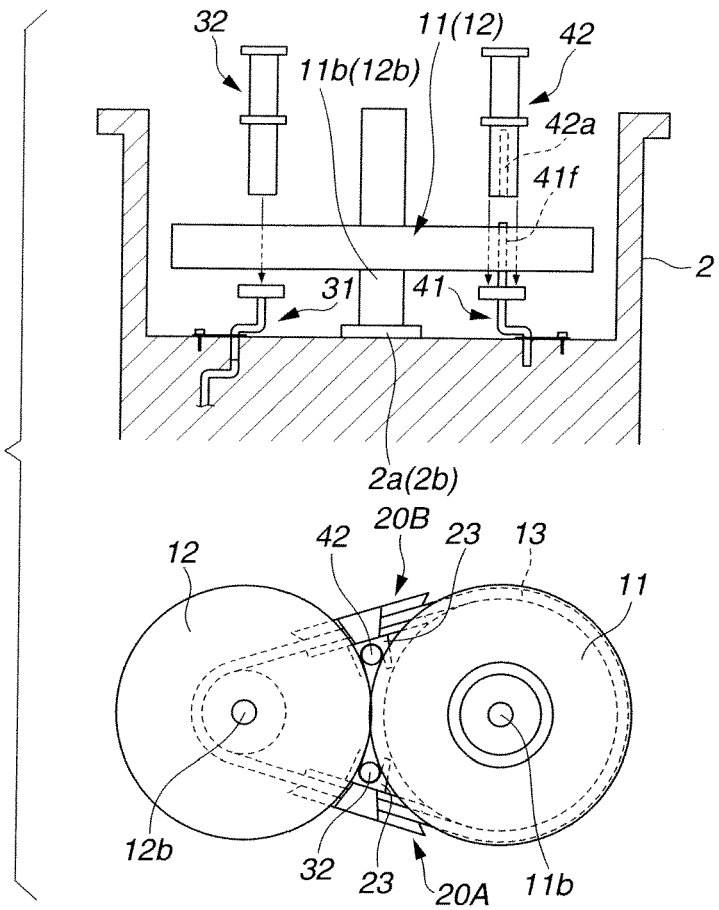
FIGS. 9E and 9F are drawings for explaining a method of assembling the continuously variable chain-belt transmission of the embodiment 1.
Figure 9F:
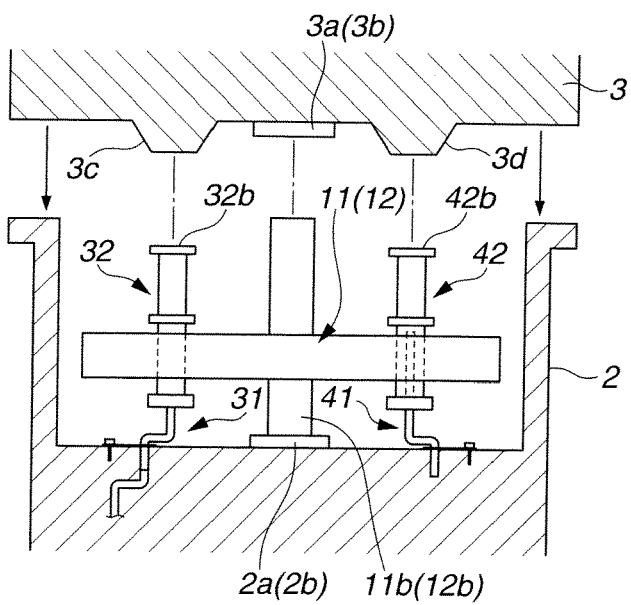

FIGS. 9E and 9F are drawings for explaining a method of assembling the chain-belt CVT of the embodiment 1. FIG. 9E is a guide supporting portion assembling process. FIG. 9F is a cover fixing process.

In the method of assembling the chain-belt CVT of the embodiment 1, a sub-line process including the procedure for assembling the chain guide and the procedure for winding the chain corresponds to a sub-line work in the assembling method. The case assembling process, the transmission assembling process, the guide supporting portion assembling process and the cover fixing process correspond to a mainline work in the assembling method.

In the procedure for assembling the chain guide, as shown in FIG. 9A, first, the chain guide 20A is split in half. Next, the chain 13 is sandwiched or enclosed by the annular guide portion 21 of the chain guide 20A. Further, the split parts of the chain guide 20A are joined together with the plurality of screws N. Through this procedure, the chain guide 20A is fitted or attached to the chain 13 with the entire circumference, in cross section, of the chain 13 enclosed by the annular guide portion 21. Likewise, the chain guide 20B is fitted or attached to the chain 13. At this time, each stem supporting portion 23 of the chain guides 20A, 20B is positioned at the rotation inner side of the chain 13 (see FIG. 2).

In the procedure for winding the chain, as shown in FIG. 9B, first, the primary pulley 11 and the secondary pulley 12 are each assembled. Next, the rotation shafts 11b, 12b of both pulleys 11, 12 are held in a standing state by an assembly jig (not shown). Further, the chain 13 is sandwiched between the primary sheave surfaces 11a of the primary pulley 11 also between the secondary sheave surfaces 12a of the secondary pulley 12, then the chain 13 is wound around the both primary and secondary pulleys 11, 12. At this time, by bringing the rotation shafts 11b, 12b closer to each other, the chain 13 is wound or hung around the both primary and secondary pulleys 11, 12, and by separating or moving the rotation shafts 11b, 12b away from each other, deflections of the chain 13 is adjusted. Simultaneously, the chain 13 is adjusted so that the chain guides 20A, 20B do not interfere with the primary and secondary pulleys 11, 12.

As mentioned above, these procedure for assembling the chain guide and procedure for winding the chain correspond to the sub-line process.

On the other hand, in the case assembling process, as shown in FIG. 9C, first, one end 31a of the lubricating oil tube 31 is inserted into the oil hole 2c of the transmission case 2, and the fixing screw N1 is inserted into the penetration hole 31e of the fixing plate member 31c and screwed into the transmission case 2. Through this process, the lubricating oil tube 31 is fixed to the transmission case 2 and also the lubricating oil tube 31 communicates with the case side lubrication circuit 2d at the same time.

Next, one end 41a of the pre-fixing pipe 41 is inserted into the fixing hole 2e of the transmission case 2, and the fixing screw N2 is inserted into the penetration hole 41e of the fixing plate member 41c and screwed into the transmission case 2. Through this process, the pre-fixing pipe 41 is fixed to the transmission case 2.

In the transmission assembling process, as shown in FIG. 9D, subsequently to the above case assembling process, first, the case side primary shaft supporting portion 2a and the case side secondary shaft supporting portion 2b respectively rotatably supporting the rotation shafts 11b, 12b are provided in the transmission case 2.

Next, the rotation shafts 11b, 12b of the primary and secondary pulleys 11, 12 around which the chain 13 is wound in the sub-line process are fixed to the respective case side primary and secondary shaft supporting portions 2a, 2b after performing each positioning.

At this time, the pre-fixing pipe 41 is adjusted so that the top end portion 41f of the pre-fixing pipe 41 is inserted or stays in the holding hook 23a of the stem supporting portion 23 of the chain guide 20B. Here, since the outside diameter of the top end portion 41f is considerably smaller (thinner) than the inside diameter of the holding hook 23a, precise or exact positioning is not required.

In the guide supporting portion assembling process, as shown in FIG. 9E, subsequently to the above transmission assembling process, first, a position of the stem supporting portion 23 of the chain guide 20A attached to the chain 13 in the sub-line process with respect to the lubricating oil tube 31 is fixed (i.e. positioning of the stem supporting portion 23 with respect to the lubricating oil tube 31 is performed). Here, with regard to the chain guide 20B, since its position with respect to the pre-fixing pipe 41 is already fixed, the positioning of the chain guide 20B is not needed here.

Next, the lubrication side cap guide 32 is inserted into the holding hook 23a of the chain guide 20A, then the lubricating oil tube 31 and the lubrication side cap guide 32 are connected. With this, the portion from one end 32a' to the middle flange 32d of the lubrication side cap guide 32 is fitted into the holding hook 23a and supports the chain guide 20A. Here, since the projections 23b, 23b interfere with the lubrication side cap guide 32, the chain guide 20A does not drop off or come off the lubrication side cap guide 32.

At this time, the lubricating oil tube 31 is inserted into the opening portion 32a, then the case side lubrication circuit 2d, the lubricating oil tube 31, the lubricating oil passage 32e and the lubricating oil jets 32f, 32f are connected.

Further, at this time, the cutting surfaces 32c of the lubrication side cap guide 32 are contiguous with or touch the inner side surfaces of the depressed portion 31d formed in the flange 31b of the top end of the lubricating oil tube 31. The cutting surfaces 32c are fitted into the depressed portion 31d, therefore the lubricating oil tube 31 and the lubrication side cap guide 32 cannot rotate.

Subsequently, the non-lubrication side cap guide 42 is inserted into the holding hook 23a of the chain guide 20B, then the pre-fixing pipe 41 and the non-lubrication side cap guide 42 are connected. With this, the portion from one end 42a' to the middle flange 42d of the non-lubrication side cap guide 42 is fitted into the holding hook 23a and supports the chain guide 20B. Here, since the projections 23b, 23b interfere with the non-lubrication side cap guide 42, the chain guide 20B does not drop off or come off the non-lubrication side cap guide 42.

At this time, the cutting surfaces 42c of the non-lubrication side cap guide 42 are contiguous with or touch the inner side surfaces of the depressed portion 41d formed in the flange 41b of the pre-fixing pipe 41. The cutting surfaces 42c are fitted into the depressed portion 41d, therefore the pre-fixing pipe 41 and the non-lubrication side cap guide 42 cannot rotate.

In the cover fixing process, as shown in FIG. 9F, subsequently to the above guide supporting portion assembling process, first, the cover side primary shaft supporting portion 3a and the cover side secondary shaft supporting portion 3b respectively rotatably supporting the rotation shafts 11b, 12b are provided in the side cover 3.

Next, the side cover 3 is fixed to the transmission case 2, then the assembling of the chain-belt CVT 1 is completed. At this time, the first contact protrusion 3c formed in the side cover 3 is contiguous with or touches the contact portion 32b of the lubrication side cap guide 32, and the second contact protrusion 3d formed in the side cover 3 is contiguous with or touches the contact portion 42b of the non-lubrication side cap guide 42. With this, the lubrication side cap guide 32 is supported by and between the lubricating oil tube 31 and the side cover 3. The non-lubrication side cap guide 42 is supported by and between the pre-fixing pipe 41 and the side cover 3.

Next, influence or action of the present embodiment will be explained. [Assembling facilitation action] will be explained first, then [Lubricating oil supply action] will be explained.

[Assembling Facilitation Action]

In the chain-belt CVT 1 of the embodiment 1, the chain 13 has the chain guides 20A, 20B restraining the movement of the chain 13 and having the annular guide portions 21. The lubrication side chain guide supporting portion 30 supporting the one chain guide 20A has the lubricating oil tube 31 fixed to the transmission case 2 and the lubrication side cap guide 32 connecting to this lubricating oil tube 31. The non-lubrication side chain guide supporting portion 40 supporting the other chain guide 20B has the pre-fixing pipe 41 fixed to the transmission case 2 and the non-lubrication side cap guide 42 connecting to this pre-fixing pipe 41 upon assembling.

That is, each of the lubrication side chain guide supporting portion 30 and the non-lubrication side chain guide supporting portion 40 respectively supporting the chain guide 20A and the chain guide 20B is configured to split between the transmission case 2 and the side cover 3.

Therefore, when previously attaching the chain guides 20A, 20B having the annular guide portions 21 to the chain 13 then fixing or installing the both pulleys 11, 12 and the chain guides 20A, 20B to the transmission case 2, it is possible to install each of the split lubrication side chain guide supporting portion 30 and the split non-lubrication side chain guide supporting portion 40 before and after the installation of the both pulleys 11, 12. As a consequence, the simultaneous positioning of axes of the both pulleys 11, 12 and the chain guides 20A, 20B is not required, and the assembling (or the installation) is facilitated. This improves the workability of the assembly.

In particular, in the chain-belt CVT 1 of the embodiment 1, the oil hole 2c that is a transmission fixing position of the lubricating oil tube 31 is positioned at a lower side of the annular guide portion 21 of the chain guide 20A (see FIG. 3). Because of this, the oil hole 2c and the annular guide portion 21 are arranged in positions where the oil hole 2c interferes with the annular guide portion 21 in the axial direction (or the annular guide portion 21 interferes with the oil hole 2c in the axial direction). The lubricating oil tube 31 is thus required to be fixed to the transmission case 2 before fixing the both pulleys 11, 12 to the transmission case 2.

In contrast to this, the lubricating oil tube 31 bends at the middle, and the axial position of the top end 31b' with respect to one end 31a of the lubricating oil tube 31 is offset. With this structure, a fixing or installing position of the lubrication side cap guide 32 does not interfere with the annular guide portion 21. Thus, the lubricating oil tube 31 can be fixed to the transmission case 2 before fixing the both pulleys 11, 12 to the transmission case 2, and afterwards the installation of the lubrication side cap guide 32 can be done.

That is, even in the case where such relationship of position between the lubrication side chain guide supporting portion 30 and the chain guide 20A that the transmission fixing position of the lubrication side chain guide supporting portion 30 interferes with the chain guide 20A exists and also the lubricating oil tube 31 is required to be fixed to the transmission case 2 before fixing the both pulleys 11, 12 to the transmission case 2, by employing the structure in which the middle portion of the lubricating oil tube 31 bends and the axial position of the top end 31b' with respect to one end 31a of the lubricating oil tube 31 is offset, the assembly can be done without simultaneously performing the positioning of axes of the both pulleys 11, 12 and the chain guide 20A.

Further, this can be used for a transmission case of a V-belt type CVT in which the oil hole 2c interferes with the annular guide portion 21 in the axial direction.

As for the other chain guide 20B and the non-lubrication side chain guide supporting portion 40, the same action can be obtained.

Furthermore, in the chain-belt CVT 1 of the embodiment 1, regarding the non-lubrication side chain guide supporting portion 40 supporting the other chain guide 20B, the top end portion 41f of the pre-fixing pipe 41 extends. Because of this, when assembling the both pulleys 11, 12, by previously aligning the position of this top end portion 41f with the position of the stem supporting portion 23 of the chain guide 20B, the position of the chain guide 20B can be temporarily fixed.

Here, since the outside diameter of the top end portion 41f of the pre-fixing pipe 41 is considerably smaller (thinner) than the inside diameter of the holding hook 23a of the stem supporting portion 23, the precise or exact positioning is not required, and the temporary fix can be easily achieved.

With this, the non-lubrication side cap guide 42 can be readily fitted into the stem supporting portion 23 of the chain guide 20B, and further improvement in the workability of the assembly can be achieved.

In addition, in the chain-belt CVT 1 of the embodiment 1, the lubricating oil tube 31 and the pre-fixing pipe 41 are formed by the pipe member. Thus these components can be formed by low-cost parts, and this leads to a reduction in cost.

Moreover, in the chain-belt CVT 1 of the embodiment 1, the lubrication side cap guide 32 and the non-lubrication side cap guide 42 have portions corresponding to the guide supporting portions (i.e. the portion from one end 32a' to the middle flange 32d and the portion from one end 42a' to the middle flange 42d) supporting the chain guides 20A, 20B respectively, also have portions corresponding to the spacer portions (i.e. the portion from the middle flange 32d to the contact portion 32b and the portion from the middle flange 42d to the contact portion 42b) positioned between the guide supporting portion and the side cover 3.

That is, the lubrication side cap guide 32 and the non-lubrication side cap guide 42 respectively have the middle flange 32d and the middle flange 42d which define a boundary between the guide supporting portion and the spacer portion. With this, even if the chain guides 20A, 20B move in each axial direction of the lubrication side chain guide supporting portion 30 and the non-lubrication side chain guide supporting portion 40, the middle flanges 32d, 42d interfere with the chain guide supporting portions 30, 40 respectively, thereby restraining the movement of the chain guide supporting portions 30, 40. As a result, the movement of the chain 13 can be properly restrained.

[Lubricating Oil Supply Action]

In the chain-belt CVT 1 of the embodiment 1, the lubricating oil tube 31 and the lubricating oil passage 32e formed inside the lubrication side cap guide 32, of the lubrication side chain guide supporting portion 30, connect to the case side lubrication circuit 2d formed in the transmission case 2, and these correspond to the supporting portion side lubrication circuit that squirts or supplies the lubricating oil to the chain 13 and the primary and secondary pulleys 11, 12.

Therefore, the lubricating oil flowing in the case side lubrication circuit 2d flows into the lubricating oil passage 32e from the lubricating oil tube 31 and squirts through the lubricating oil jets 32f, 32f. With this, supply of the lubricating oil to the chain 13 and the primary and secondary pulleys 11, 12 can be achieved without providing a system or structure of supply of the lubricating oil. That is, the lubrication side chain guide supporting portion 30 serves also as the lubricating oil supply system.

Figure 10:
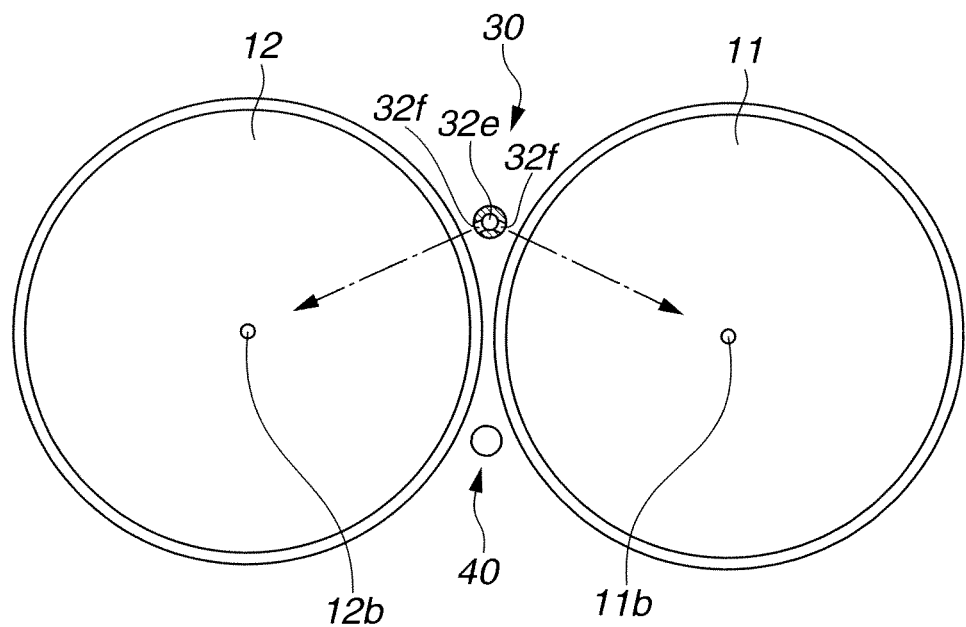
FIG. 10 is a drawing for explaining directions of jet of lubricating oil in the continuously variable chain-belt transmission of the embodiment 1.

In particular, as shown in FIG. 10, the lubricating oil jets 32f, 32f open in the directions facing to the rotation shafts 11b, 12b of the primary and secondary pulleys 11, 12. Hence, it is possible to actively or positively squirt the lubricating oil to contact parts between the primary and secondary sheave surfaces 11a, 12a and the chain 13.

In the chain-belt CVT 1 of the embodiment 1, even if load in the axial direction is applied to the lubrication side cap guide 32 by a change of the radii of winding parts of the chain due to the movement of the chain 13 or a shift change (a speed change), since the lubrication side cap guide 32 is supported by and between the lubricating oil tube 31 and the side cover 3, movement in the axial direction of the lubrication side cap guide 32 can be restrained. Further, since this lubrication side cap guide 32 is fixed so as not to rotate with respect to the lubricating oil tube 31, even if load in a rotation direction is applied to the lubrication side cap guide 32, movement in the rotation direction of the lubrication side cap guide 32 can be restrained. Each opening direction of the lubricating oil jets 32f, 32f formed in the lubrication side cap guide 32 is therefore fixed or is held constant, a stable supply of the lubricating oil can be achieved.

In addition, since the non-lubrication side cap guide 42 is supported by and between the pre-fixing pipe 41 and the side cover 3, even if load in the axial direction is applied to the non-lubrication side cap guide 42, movement in the axial direction of the non-lubrication side cap guide 42 can be restrained. Further, since this non-lubrication side cap guide 42 is fixed so as not to rotate with respect to the pre-fixing pipe 41, even if load in a rotation direction is applied to the non-lubrication side cap guide 42, movement in the rotation direction of the non-lubrication side cap guide 42 can be restrained.

Next, effects of the present invention will be explained. The chain-belt CVT of the embodiment 1 provides the following effects.

(1) A continuously variable chain-belt transmission (chain-belt CVT) 1 housed in a transmission casing 4 formed by a transmission case 2 and a side cover 3, comprises: a pair of conical disk pairs (a primary pulley 11, a secondary pulley 12), each pair of which is rotatably supported by disk supporting portions (a case side primary shaft supporting portion 2a, a case side secondary shaft supporting portion 2b, a cover side primary shaft supporting portion 3a, a cover side secondary shaft supporting portion 3b) provided in the transmission case 2 and the side cover 3; a chain 13 wound around the pair of conical disk pairs 11, 12; a chain guide 20A attached to the chain 13 to restrain movement of the chain 13 and having an annular guide portion 21 that encloses an entire circumference, in cross section, of the chain 13; and a chain guide supporting portion (a lubrication side chain guide supporting portion 30) supporting the chain guide 20A between the transmission case 2 and the side cover 3) and having a fixing side chain guide supporting portion (a lubricating oil tube 31) fixed to the transmission case 2; and a connecting side chain guide supporting portion (a lubrication side cap guide 32) connecting to the fixing side chain guide supporting portion 31.

Because of this, it is possible to facilitate the assembly and improve the workability of the assembly when securing the two conical pulley pairs 11, 12 and the chain guide 20A to the transmission case 2 after the chain guide 20A is previously fitted to the chain 13.

(2) A case side lubrication circuit 2d is formed in the transmission case 2, and the chain guide supporting portion 30 has a supporting portion side lubrication circuit (a lubricating oil tube 31, a lubricating oil passage 32e, a lubricating oil jet 32f) which connects to the case side lubrication circuit 2d and supplies lubricating oil to the chain 13 and the pair of conical disk pairs 11, 12.

With this, in addition to the effect of (1), the lubrication side chain guide supporting portion 30 serves also as the lubricating oil supply system, and supply of the lubricating oil to the chain 13 and the primary and secondary pulleys 11, 12 can be achieved without providing the system or structure of supply of the lubricating oil. This leads to reduction in size of the chain-belt CVT 1.

(3) One end 32a' of the connecting side chain guide supporting portion (the lubrication side cap guide 32) connects to the fixing side chain guide supporting portion (the lubricating oil tube 31), and the other end 32b of the connecting side chain guide supporting portion 32 is contiguous with the side cover 3, then the connecting side chain guide supporting portion 32 is supported by and between the fixing side chain guide supporting portion 31 and the side cover 3, and the connecting side chain guide supporting portion 32 is fixed to the fixing side chain guide supporting portion 31 so as not to rotate with respect to the fixing side chain guide supporting portion 31.

With this, in addition to the effect of (1) and (2), even if load in the axial direction is applied to the lubrication side cap guide 32, movement in the axial direction of the lubrication side cap guide 32 can be restrained, and the chain guide 20A can be supported with stability.

(4) The fixing side chain guide supporting portion (the lubricating oil tube 31) is formed by a pipe member.

With this, in addition to the effect of (1)~(3), the components can be formed by low-cost parts, and this leads to a reduction in cost.

(5) The connecting side chain guide supporting portion (the lubrication side cap guide 32) has a guide supporting portion (a portion from one end 32a' to the middle flange 32d) that supports the chain guide 20A and a spacer portion (a portion from the middle flange 32d to the contact portion 32b) that is positioned between the guide supporting portion and the side cover 3.

With this, in addition to the effect of (1)~(4), even if the chain guide 20A moves in the axial direction of the lubrication side chain guide supporting portion 30, the movement can be properly restrained, and the stable support of the chain guide 20A can be achieved.

(6) The chain guide includes a pair of chain guides and the chain guide supporting portion includes a first chain guide supporting portion (a lubrication side chain guide supporting portion 30) supporting one chain guide 20A and a second chain guide supporting portion (a non-lubrication side chain guide supporting portion 40) supporting the other chain guide 20B, the first chain guide supporting portion 30 has the fixing side chain guide supporting portion (the lubricating oil tube 31) having the supporting portion side lubrication circuit connecting to the case side lubrication circuit 2d formed in the transmission case 2; and the connecting side chain guide supporting portion (the lubrication side cap guide 32) that has a lubricating oil jet 32f, and the second chain guide supporting portion 40 has the fixing side chain guide supporting portion (the pre-fixing pipe 41) that has a protruding portion 41f to temporarily fix a position of the other chain guide 20B; and the connecting side chain guide supporting portion (the non-lubrication side cap guide 42) that has a fitting portion 42a into which the protruding portion 41f is fitted.

With this, in addition to the effect of (1)~(5), improvement in the workability of the assembly and supply of the lubricating oil can be achieved.

(7) A method for assembling a continuously variable chain-belt transmission (chain-belt CVT) 1, the chain-belt CVT housed in a transmission casing 4 formed by a transmission case 2 and a side cover 3 and having a pair of conical disk pairs (a primary pulley 11, a secondary pulley 12), a chain 13 wound around the pair of conical disk pairs 11, 12, a chain guide 20A having an annular guide portion 21 that encloses an entire circumference, in cross section, of the chain 13 and supporting the chain 13, and a chain guide supporting portion 30 supporting the chain guide 20A and having a fixing side chain guide supporting portion 31 and a connecting side chain guide supporting portion 32, the method comprises: a sub-line assembling process having (a) a procedure for assembling the chain guide 20A (FIG. 9A) in which the chain guide 20A is attached to the chain 13 with the entire circumference, in cross section, of the chain 13 enclosed by the annular guide portion 21; and (b) a procedure for winding the chain 13 (FIG. 9B) in which the chain 13 is wound around the conical disk pairs 11, 12; a case assembling process (FIG. 9C) in which the fixing side chain guide supporting portion 31 is fixed to the transmission case 2; a transmission assembling process (FIG. 9D) in which, after fixing positions of rotation shafts 11b, 12b of the conical disk pairs 11, 12 around which the chain 13 is wound in the sub-line assembling process with respect to the transmission case 2, the conical disk pairs 11, 12 are fixed to disk supporting portions 2a, 2b provided in the transmission case 2; a guide supporting portion assembling process (FIG. 9E) in which, after fixing a position of the chain guide 20A attached to the chain 13 in the sub-line assembling process with respect to the fixing side chain guide supporting portion 31, the connecting side chain guide supporting portion 32 is connected to the fixing side chain guide supporting portion 31; and a cover fixing process (FIG. 9F) in which, by fixing the side cover 3 to the transmission case 2, the connecting side chain guide supporting portion 32 is supported by the fixing side chain guide supporting portion 31 and the side cover 3.

Because of this, it is possible to facilitate the assembly and improve the workability of the assembly when securing the two conical pulley pairs 11, 12 and the chain guide 20A to the transmission case 2 after the chain guide 20A is previously fitted to the chain 13.

(8) The chain guide includes a pair of chain guides and the chain guide supporting portion includes a first chain guide supporting portion (a lubrication side chain guide supporting portion 30) supporting one chain guide 20A and a second chain guide supporting portion (a non-lubrication side chain guide supporting portion 40) supporting the other chain guide 20B, the first chain guide supporting portion 30 has the fixing side chain guide supporting portion (the lubricating oil tube 31) having the supporting portion side lubrication circuit connecting to the case side lubrication circuit 2d formed in the transmission case 2; and the connecting side chain guide supporting portion (the lubrication side cap guide 32) that has a lubricating oil jet 32f, and the second chain guide supporting portion 40 has the fixing side chain guide supporting portion (the pre-fixing pipe 41) that has a protruding portion 41f to temporarily fix a position of the other chain guide 20B; and the connecting side chain guide supporting portion (the non-lubrication side cap guide 42) that has a fitting portion 42a into which the protruding portion 41f is fitted.

With this, in addition to the effect of (7), improvement in the workability of the assembly and supply of the lubricating oil can be achieved.

Although the chain-belt CVT and the method of assembling the chain-belt CVT according to the present invention has been explained on the basis of the embodiment 1, the present invention is not limited to the embodiment 1.

For example, both chain guide supporting portions 30, 40 respectively supporting the pair of chain guides 20A, 20B could have the supporting portion side lubrication circuit. Both fixing side chain guide supporting portions 31, 41 could be provided with the protruding portion that temporarily fixes the position of the chain guide.

The entire contents of Japanese Patent Application No. 2010-080051 filed on Mar. 31, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A continuously variable chain-belt transmission housed in a transmission casing formed by a transmission case and a side cover, comprising:

a pair of conical disk pairs, each pair of which is rotatably supported by disk supporting portions provided in the transmission case and the side cover;

a chain wound around the pair of conical disk pairs;

a chain guide attached to the chain to restrain movement of the chain and having an annular guide portion that encloses an entire circumference, in cross section, of the chain; and a chain guide supporting portion supporting the chain guide between the transmission case and the side cover and having:
  (a) a fixing side chain guide supporting portion fixed to the transmission case; and
  (b) a connecting side chain guide supporting portion connecting to the fixing side chain guide supporting portion, wherein the chain guide supporting portion is configured to be split in half.

2. The continuously variable chain-belt transmission as claimed in claim 1, wherein:
  a case side lubrication circuit is formed in the transmission case, and
  the chain guide supporting portion has a supporting portion side lubrication circuit which connects to the case side lubrication circuit and supplies lubricating oil to the chain and the pair of conical disk pairs.

3. The continuously variable chain-belt transmission as claimed in claim 2, wherein:
  the chain guide includes a pair of chain guides, and the chain guide supporting portion includes a first chain guide supporting portion supporting one chain guide and a second chain guide supporting portion supporting the other chain guide,
  the first chain guide supporting portion has
    (a) the fixing side chain guide supporting portion having the supporting portion side lubrication circuit connecting to the case side lubrication circuit formed in the transmission case; and
    (b) the connecting side chain guide supporting portion that has a lubricating oil jet, and
  the second chain guide supporting portion has
    (c) the fixing side chain guide supporting portion that has a protruding portion to temporarily fix a position of the other chain guide; and
    (d) the connecting side chain guide supporting portion that has a fitting portion into which the protruding portion is fitted.

4. The continuously variable chain-belt transmission as claimed in claim 1, wherein:
  one end of the connecting side chain guide supporting portion connects to the fixing side chain guide supporting portion, and the other end of the connecting side chain guide supporting portion is contiguous with the side cover, such that the connecting side chain guide supporting portion is supported by and between the fixing side chain guide supporting portion and the side cover, and
  the connecting side chain guide supporting portion is fixed to the fixing side chain guide supporting portion so as not to rotate with respect to the fixing side chain guide supporting portion.

5. The continuously variable chain-belt transmission as claimed in claim 1, wherein:
  the fixing side chain guide supporting portion is formed by a pipe member.

6. The continuously variable chain-belt transmission as claimed in claim 1, wherein:
  the connecting side chain guide supporting portion has a guide supporting portion that supports the chain guide and a spacer portion that is positioned between the guide supporting portion and the side cover.

* * * * *